United States Patent
Kobori et al.

(10) Patent No.: US 8,041,472 B2
(45) Date of Patent: Oct. 18, 2011

(54) POSITIONING DEVICE, AND NAVIGATION SYSTEM

(75) Inventors: Norimasa Kobori, Toyota (JP); Kazunori Kagawa, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 810 days.

(21) Appl. No.: 12/089,651

(22) PCT Filed: Jun. 8, 2007

(86) PCT No.: PCT/JP2007/061609
§ 371 (c)(1),
(2), (4) Date: Apr. 9, 2008

(87) PCT Pub. No.: WO2008/012997
PCT Pub. Date: Jan. 31, 2008

(65) Prior Publication Data
US 2008/0228395 A1    Sep. 18, 2008

(30) Foreign Application Priority Data

Jul. 25, 2006    (JP) .................................. 2006-202475

(51) Int. Cl.
*G01C 21/00* (2006.01)
*G01C 21/30* (2006.01)

(52) U.S. Cl. ................. 701/8; 701/7; 701/214; 701/216; 701/221

(58) Field of Classification Search .................... None
See application file for complete search history.

(56) References Cited

U.S. PATENT DOCUMENTS

| 6,253,150 B1 * | 6/2001 | Nakamura .................... 701/208 |
| 7,096,116 B2 * | 8/2006 | Tanaka et al. ................ 701/200 |
| 2002/0032520 A1 * | 3/2002 | Katayama et al. ............ 701/208 |

(Continued)

FOREIGN PATENT DOCUMENTS

JP    5 66713    3/1993

(Continued)

OTHER PUBLICATIONS

Maan E. El Najjar, et al., "A Road-Matching Method for Precise Vehicle Localization Using Belief Theory and Kalman Filtering", Autonomous Robots, vol. 19, No. 2, Sep. 1, 2005, XP-019204923, pp. 173-191.

*Primary Examiner* — Khoi Tran
*Assistant Examiner* — Bao Long Nguyen
(74) *Attorney, Agent, or Firm* — Oblon, Spivak, McClelland, Maier & Neustadt, L.L.P.

(57) ABSTRACT

A positioning device that detects a position of a mobile body with a radio navigation positioning unit includes: first and second autonomous sensors obtaining behavioral information on the mobile body; a position detecting unit obtaining an estimated position and an estimated direction by updating a detection result based on the behavioral information from the first autonomous sensor; a map data positioning unit that refers to a map data storage unit based on the estimated position and obtains a map data linked position at a predetermined distance away from a link; a direction detecting unit obtaining a cumulative estimated direction by updating the detection result based on the behavioral information from the second autonomous sensor; and a most probable position estimating unit estimating the position of the mobile body from the estimated positions and directions using the Kalman filter.

8 Claims, 8 Drawing Sheets

U.S. PATENT DOCUMENTS

| | | | |
|---|---|---|---|
| 2006/0271279 A1* | 11/2006 | Kwak | 701/207 |
| 2009/0271108 A1* | 10/2009 | Kobori et al. | 701/208 |
| 2010/0019963 A1* | 1/2010 | Gao et al. | 342/357.04 |

FOREIGN PATENT DOCUMENTS

| | | |
|---|---|---|
| JP | 2000 346663 | 12/2000 |
| JP | 2002 213979 | 7/2002 |
| JP | 2006 78286 | 3/2006 |
| JP | 2006 126101 | 5/2006 |
| JP | 2007 139601 | 6/2007 |
| WO | WO 2007/057771 A2 | 5/2007 |
| WO | WO 2007/057771 A3 | 5/2007 |

* cited by examiner

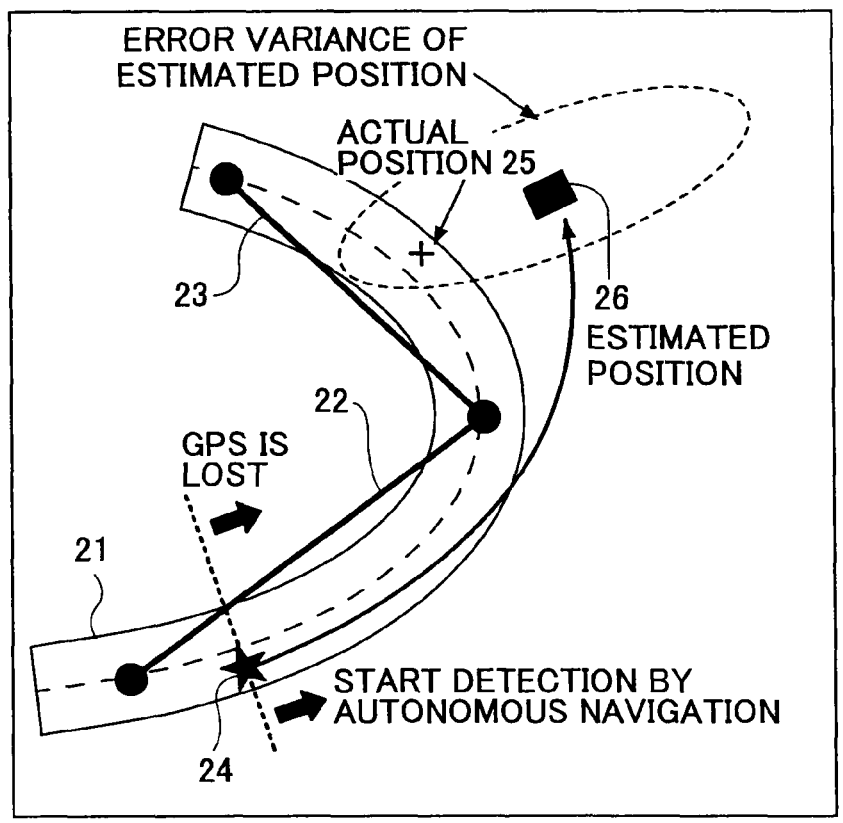
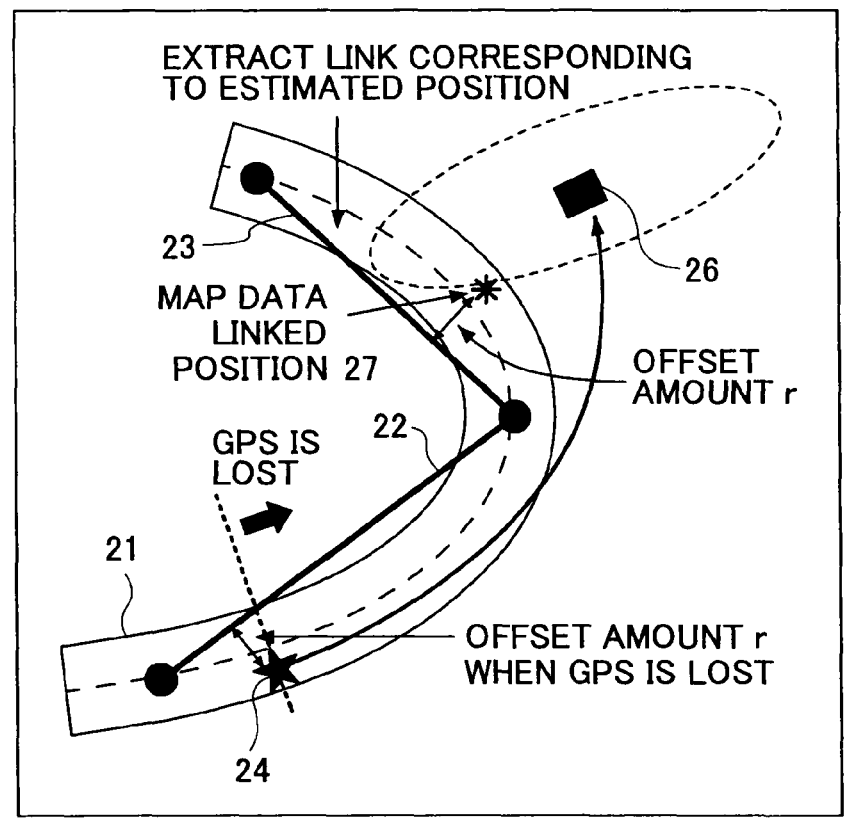

POSITIONING DEVICE, AND NAVIGATION SYSTEM

TECHNICAL FIELD

The present invention generally relates to a positioning device for detecting the position of a mobile body and a navigation system including the positioning device. More particularly, the present invention relates to a positioning device that estimates the current position of a mobile body by updating a previous position of the mobile body detected by radio navigation based on information from an autonomous sensor and map data, and a navigation system including the positioning device.

BACKGROUND ART

In some navigation systems, the current position of a vehicle can be accurately estimated by updating a previous position of the vehicle, which is detected using radio signals from global positioning system (GPS) satellites, based on the travel distance and the direction of the vehicle obtained by a speed sensor and a gyro sensor.

However, in a situation where radio signals from GPS satellites cannot be received, the position estimated by autonomous navigation deviates from the actual position and the accuracy of the estimated position decreases gradually as time passes. To cope with this problem, various methods for correcting a vehicle position estimated by autonomous navigation have been proposed.

For example, in a map matching method, a position estimated by autonomous navigation is corrected by using map data of a navigation system. According to a map matching method, positions of a vehicle estimated by autonomous navigation are mapped onto positions in map data, which are represented by nodes (e.g. intersections) and links (e.g. roads) connecting the nodes, so that the estimated traveling path of the vehicle matches actual roads.

However, generally, map data are not accurate enough to obtain satisfactory results by a map matching method. A method disclosed in patent document 1 tries to solve this problem. In the disclosed method, the position and direction of a vehicle estimated by autonomous navigation are corrected by selecting from map data a road having a position and a direction closest to the estimated position and direction and by mapping the estimated position and direction onto those of the selected road.

[Patent document 1] Japanese Patent Application Publication No. 2002-213979

DISCLOSURE OF INVENTION

Problems to be Solved by the Invention

The disclosed method, however, may still not be able to provide satisfactory results because of insufficient accuracy of map data of commercially available navigation systems and because links (e.g. roads) connecting nodes (e.g. intersections) in map data are represented by straight lines and are not always identical with the actual shapes of roads.

FIG. 1A is a drawing illustrating a difference between a link in map data and the actual shape of a road. In FIG. 1A, an actual road, which is curving gently, is represented by two linear links and therefore there are some differences between them. Let us assume that a vehicle is at an "actual vehicle position" shown in FIG. 1A. When GPS signals can be received, the actual vehicle position can be correctly detected.

However, if the position of the vehicle is estimated by autonomous navigation and mapped onto a position on a linear link while GPS signals are lost, it may result in a difference L between the mapped position and the actual vehicle position.

FIG. 1B is a graph showing differences between mapped positions and actual positions obtained in a survey to determine the accuracy of map data. In FIG. 1B, the horizontal axis indicates measurement points (identification numbers of measurement points) and the vertical axis indicates the differences between mapped positions and actual positions. As shown in FIG. 1B, the differences are greater (for example, about 6 m) at positions midway between nodes than at positions near the nodes. The results of the survey show that it is difficult to accurately estimate the position of a vehicle by a conventional map matching method without GPS signals.

The above problem may be solved by using high-accuracy map data. However, it is difficult to create such high-accuracy map data for all roads since it requires accurate measurements of roads and improvement in precision of links.

A general object of the present invention is to solve or reduce one or more problems caused by the limitations and disadvantages of the related art. A more particular object of the present invention is to provide a positioning device that can accurately estimate the position of a mobile body using conventional map data even when GPS signals are lost, and a navigation system including the positioning device.

Means for Solving the Problems

An embodiment of the present invention provides a positioning device that detects a position of a mobile body with a radio navigation positioning unit. The positioning device includes a first autonomous sensor configured to obtain behavioral information on the mobile body; a position detecting unit configured to obtain an estimated position of the mobile body by updating a detection result from the radio navigation positioning unit based on the behavioral information obtained by the first autonomous sensor; a map data positioning unit configured to refer to a map data storage unit based on the estimated position obtained by the position detecting unit and thereby to obtain a map data linked position that is a predetermined distance away from a link corresponding to the estimated position; and a most probable position estimating unit configured to estimate the position of the mobile body from the estimated position and the map data linked position by using the Kalman filter.

Another embodiment of the present invention provides a navigation system including a positioning device that detects a position of a mobile body with a radio navigation positioning unit. The positioning device includes a first autonomous sensor configured to obtain behavioral information on the mobile body; a position detecting unit configured to obtain an estimated position of the mobile body by updating a detection result from the radio navigation positioning unit based on the behavioral information obtained by the first autonomous sensor; a map data positioning unit configured to refer to a map data storage unit based on the estimated position obtained by the position detecting unit and thereby to obtain a map data linked position that is a predetermined distance away from a link corresponding to the estimated position; and a most probable position estimating unit configured to estimate the position of the mobile body from the estimated position and the map data linked position by using the Kalman filter.

Advantageous Effect of the Invention

Embodiments of the present invention provide a positioning device that can accurately estimate the position of a mobile body using conventional map data even when GPS signals are lost, and a navigation system including the positioning device.

BRIEF DESCRIPTION OF THE DRAWINGS

FIGS. 4A and 4B are drawings showing positions detected by two sensor systems, which positions are to be coupled by the Kalman filter;

EXPLANATION OF REFERENCES

Figure 1A:
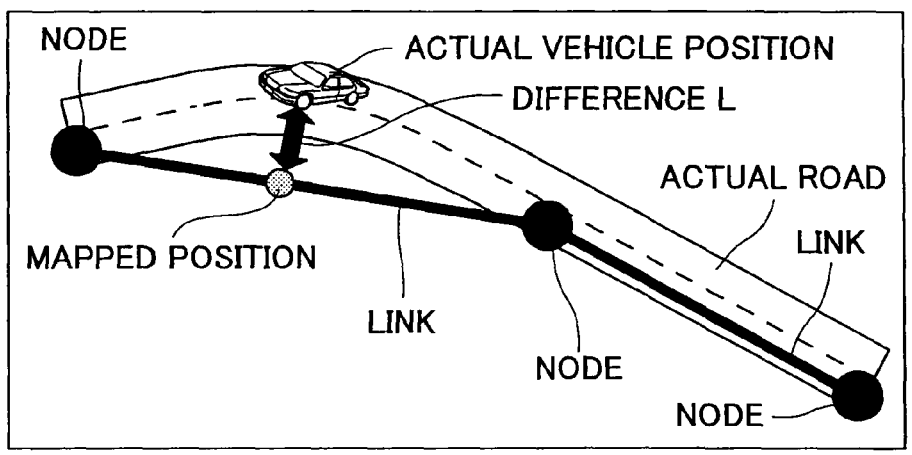
FIGS. 1A and 1B show differences between links in map data and actual shapes of roads.
Figure 1B:
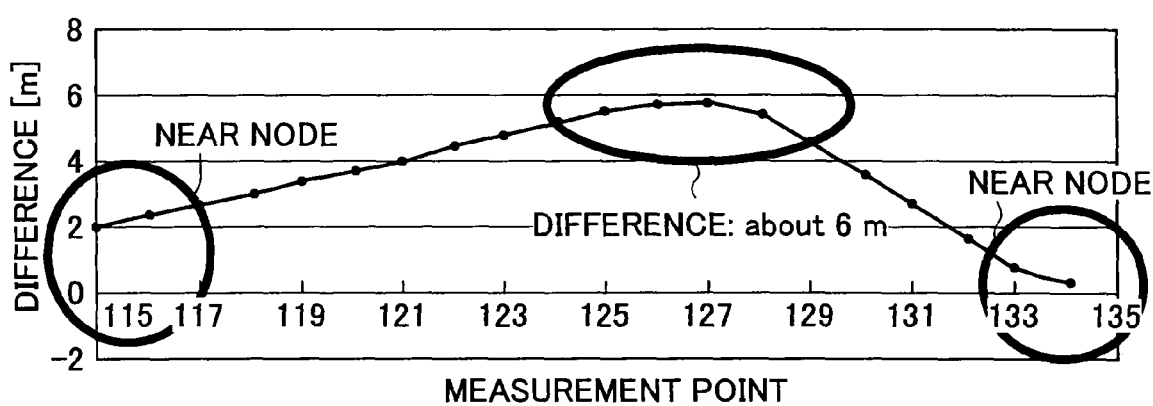

1 GPS receiver
2 Speed sensor
3 Yaw rate sensor
4 Rudder angle sensor
5 Map database
6 Input unit
7 Display unit
8 Navigation ECU
9 Positioning device
10 Navigation system

BEST MODE FOR CARRYING OUT THE INVENTION

The best mode for carrying out the invention is described based on the following embodiments with reference to the accompanying drawings.

Figure 2:
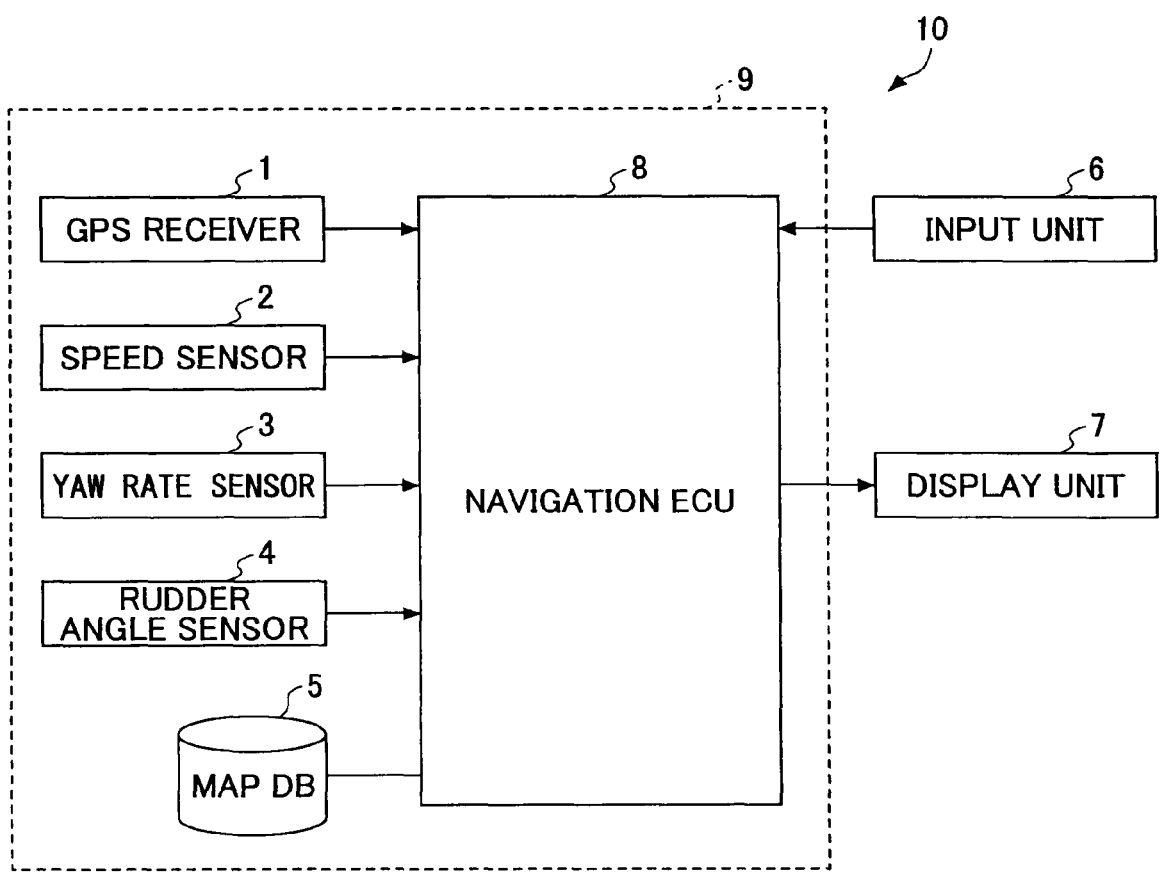
FIG. 2 is a block diagram illustrating a configuration of a navigation system including a positioning device.

FIG. 2 is a block diagram illustrating a configuration of a navigation system 10 including a positioning device 9 according to an embodiment of the present invention.

The navigation system 10 includes a navigation electrical control unit (ECU) 8 for controlling the entire navigation system 10. The navigation ECU 8 is implemented by a computer where a CPU for executing programs, a storage unit (e.g. hard disk drive or ROM) for storing programs, a RAM for temporarily storing data and programs, an input/output unit for inputting and outputting data, and a non-volatile RAM are connected by a bus.

The following components are connected to the navigation ECU 8: a GPS receiver 1 for receiving radio signals from GPS satellites, a speed sensor 2 for detecting the speed of a vehicle, a yaw rate sensor 3 for detecting a rotational angular speed around an axis (rolling axis) extending through the center of gravity of a vehicle in the forward and backward directions of the vehicle, a rudder angle sensor 4 for detecting a rudder angle of a steering wheel, a map database (DB) 5 containing map data, an input unit 6 for operating the navigation system 10, and a display unit 7, such as a liquid crystal display or a heads-up display (HUD), for displaying the current position of a vehicle on a map.

The map DB 5 is a tabular database containing map data where an actual road network is represented by nodes (e.g. intersections and points placed at certain intervals between the intersections) and links (roads connecting the nodes).

The navigation ECU 8 retrieves a map of an area around a detected current position of a vehicle from the map DB 5 and displays the retrieved map to a specified scale on the display unit 7 provided in the cabin of the vehicle. The navigation ECU 8 superposes the current position of the vehicle on the map as needed.

Also, when a destination is input from the input unit 6, such as a keyboard or a remote control, the navigation ECU 8 searches for a route from the current position to the destination by a known route search method such as the Dijkstra method, superposes the route on the map, and gives guidance on the route to the driver at a point before an intersection where the route turns right or left.

Figure 3A:
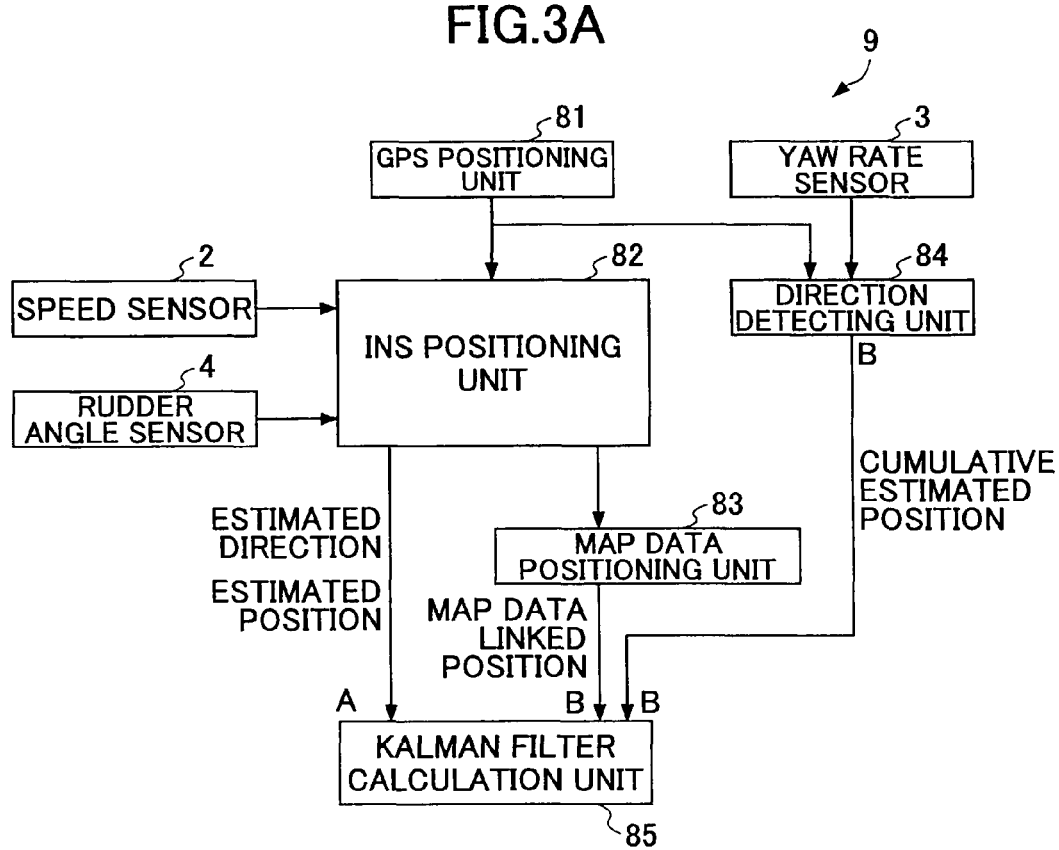
FIG. 3A is a block diagram illustrating a functional configuration of a positioning device.

The CPU of the navigation ECU 5 performs a position detecting process of this embodiment by executing a program stored in the storage unit. FIG. 3A is a block diagram illustrating a functional configuration of the positioning device 9.

The positioning device 9 of this embodiment is capable of detecting the position of a vehicle with high accuracy even when it is difficult to receive GPS signals or when the reliability of GPS positioning is low. In summary, the positioning device 9 obtains the most probable position of a vehicle by using the Kalman filter from positional information obtained by autonomous navigation and positional information obtained based on the map DB 5. This method makes it possible to increase the accuracy of an estimated position compared with a map matching method where detection results obtained by autonomous navigation are simply mapped onto map data. As is evident from the results of an experiment described later, the position correction method of this embodiment has an advantage especially in correcting positional deviation in a direction orthogonal to the traveling direction of a vehicle (lengthwise direction of a road).

To apply the Kalman filter, sets of positional information to be coupled must be obtained from separate sensor systems. In this embodiment, positional information is obtained from each of the following two sensor systems A and B:

A. Speed sensor 2 and rudder angle sensor 4
B. Map DB 5 and yaw rate sensor 3

Alternatively, the yaw rate sensor 3 may be included in the sensor system A and the rudder angle sensor 4 may be included in the sensor system B. Also, a gyro sensor may be used to detect the direction of movement of a vehicle.

When applying the Kalman filter, two sets of positional information from the sensor systems A and B are coupled by an observation equation. However, since the sensor system A detects the position and direction of a vehicle and the sensor system B detects the relative distance and relative direction of a vehicle in relation to the map data contained in the map DB 5, the two sets of positional information from the sensor systems A and B cannot be directly coupled. Therefore, the positioning device 9 of this embodiment uses an observation equation for coupling the two sets of positional information from the sensor systems A and B. The operation of the positioning device 9 is described below in detail.

A GPS positioning unit 81 detects the position of a vehicle based on radio signals from GPS satellites according to a known method. The GPS positioning unit 81 selects four or more of orbiting GPS satellites, which four or more of the GPS satellites are within a predetermined elevation angle range from the current position of a vehicle, and receives radio signals from the selected GPS satellites. Next, the GPS positioning unit 81 calculates the arrival time of the radio signals, and obtains the distances between the vehicle and the selected GPS satellites based on the calculated arrival time and the speed of light c. Then, the GPS positioning unit 81 determines a point that is at the calculated distances from three of the selected GPS satellites and uses the point as the position of the vehicle.

The positioning device 9 detects the position of the vehicle at predetermined time intervals while GPS signals are receivable. When GPS signals are lost, the positioning device 9 starts detecting the position of the vehicle by autonomous navigation. The positioning device 9 uses the last position and direction of the vehicle detected before the GPS signals are lost as an initial position and an initial direction, and updates the initial position and direction by the traveling distance and direction obtained by autonomous navigation.

FIG. 4A is a drawing showing a position detected by autonomous navigation (by the sensor system A). In FIG. 4A, a road 21 is represented by two links 22 and 23 in map data retrieved from the map DB 5. It is assumed that the vehicle is traveling in a direction from the link 22 to the link 23 and that GPS signals are lost at an initial position 24.

When GPS signals are lost, an inertial navigation sensor (INS) positioning unit 82 obtains the speed of the vehicle from the speed sensor 2 and the rudder angle from the rudder angle sensor 4, updates the initial position 24 and the initial direction by the traveling distance and direction obtained from the speed and rudder angle, and thereby estimates the current position and direction (hereafter called the estimated position and direction) of the vehicle by autonomous navigation. An actual position 25 of the vehicle and an estimated position 26 obtained by autonomous navigation are shown in FIG. 4A.

To apply the Kalman filter, it is necessary to obtain the error variance of positional information of each of the sensor systems. Errors in detection results of the speed sensor 2 and the rudder angle sensor 4 are known and in proportion to the speed of the vehicle and the duration for which GPS signals are lost. Therefore, the error variance of the estimated position 26 obtained by updating the initial position 24 based on the detection results from those sensors is also known. In FIG. 4A, the error variance of the estimated position 26 is shown by an ellipse indicated by a dotted line.

FIG. 4B shows a position obtained by mapping the estimated position 26 obtained by the INS positioning unit 82 to a link in the map DB 5 (of the sensor system B). The estimated position 26 obtained by the INS positioning unit 82 is input to a map data positioning unit 83. The map data positioning unit 83 extracts the link 23 corresponding to the estimated position 26 from the map DB 5.

Here, it can be assumed that the vehicle is at a position near the estimated position 26 and the link 23. Therefore, the map data positioning unit 83 estimates that the vehicle is at some point (hereafter called a map data linked position 27) on a line that is at a predetermined distance r (hereafter called an offset amount r) from the link 23 toward the estimated position 26.

The offset amount r corresponds to the distance between the initial position 24, which is obtained just before the GPS signals are lost, and the link 22. This means that the map data positioning unit 83 assumes that the offset between the initial position 24 and the link 22 is unchanged.

Since both the estimated position 26 and the offset amount r are estimated values, the map data linked position 27 is not narrowed down to a single point but corresponds to any point on a line that is distant from the link 23 by the offset amount r.

Figure 5A:
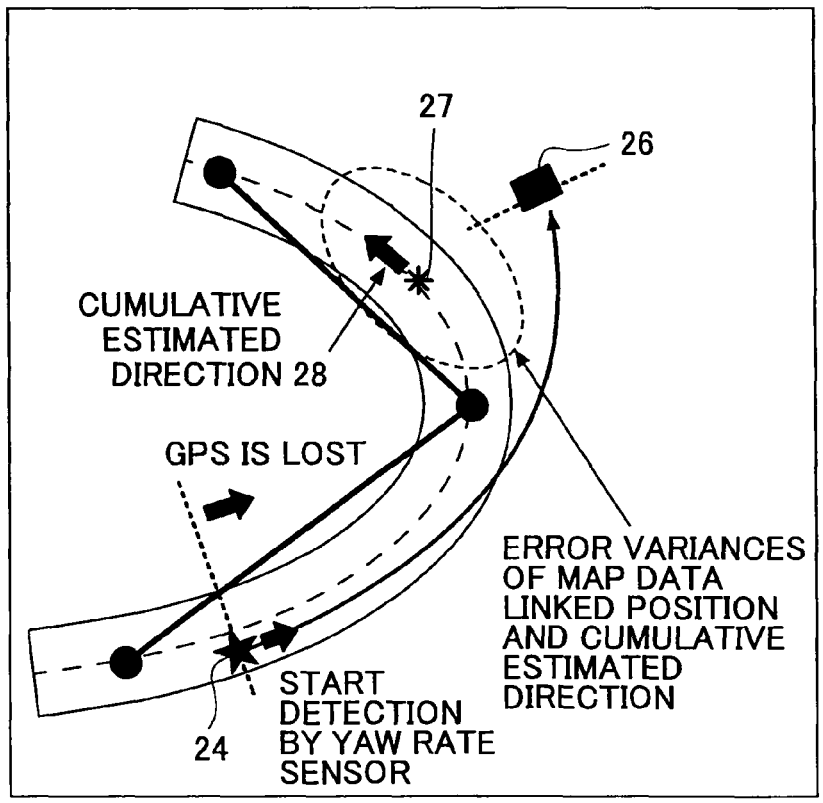
FIGS. 5A and 5B are other drawings showing positions detected by two sensor systems, which positions are to be coupled by the Kalman filter.

FIG. 5A shows the movement direction of the vehicle estimated based on detection results of the yaw rate sensor 3 (of the sensor system B). A direction detecting unit 84 receives the initial direction from the GPS positioning unit 81, updates the initial direction based on integrals of yaw rates (which indicate directions) obtained by the yaw rate sensor 3, and thereby estimates the direction (hereafter called a cumulative estimated direction 28) of the vehicle. This means that different estimates of the direction of the vehicle are obtained based on the detection results of the sensor systems A and B.

The map data linked position 27 obtained as described above naturally has an error variance and the cumulative estimated direction 28 also has an error resulting from errors in the detection results of the yaw rate sensor 3. The map data positioning unit 83 calculates the error variances of the map data linked position 27 and the cumulative estimated direction 28 based on the offset amount r, the speed of the vehicle, and the duration for which GPS signals are lost.

Figure 5B:
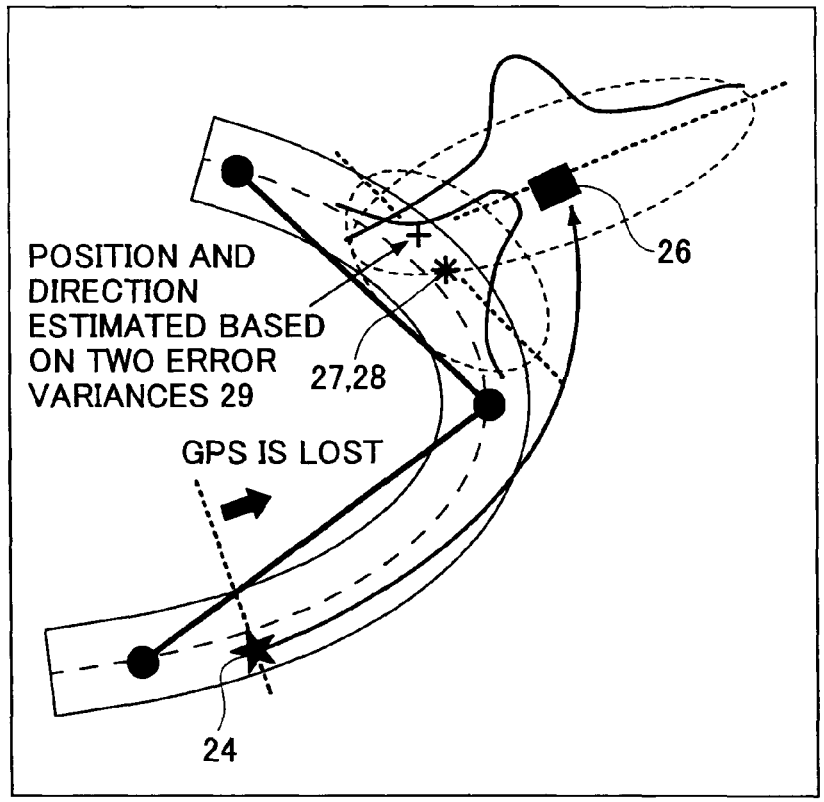

After two sets of estimates of the position and direction of the vehicle are obtained based on the detection results of the sensor systems A and B, a Kalman filter calculation unit 85 calculates the most probable position and direction of the vehicle. FIG. 5B shows a final estimated position 29 that is calculated based on: the estimated position 26 and the estimated direction obtained from the detection results of the sensor system A; and the map data linked position 27 and the cumulative estimated direction 28 obtained from the detection results of the sensor system B. The final estimated position 29 includes information indicating direction.

Figure 3B:
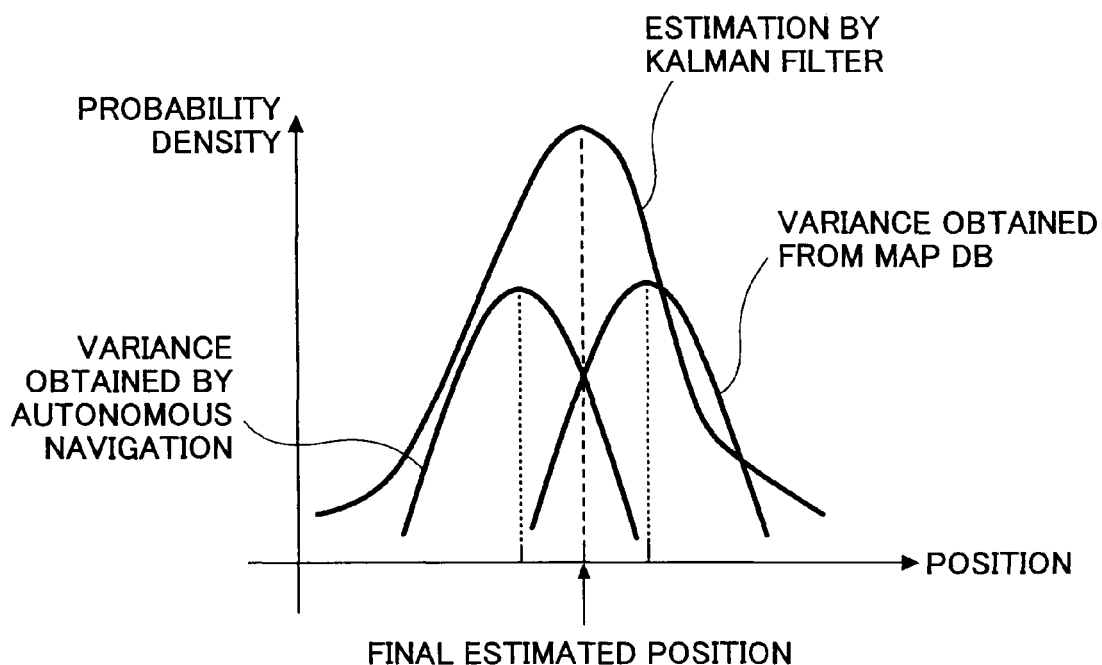
FIG. 3B is a graph showing estimation by the Kalman filter.

In FIG. 5B, the error variances of the sensor systems A and B are shown as having peaks respectively at the estimated position 26 and the map data linked position 27. However, in actual cases, the error variances are three-dimensional. FIG. 3B is a graph showing the error variances and the most probable position estimated by using the Kalman filter. The Kalman filter, when independently-estimated states of a system are given, estimates the most probable state of the system based on probability density distributions of the states (the most probable state is where the product of the distributions becomes maximum). Therefore, it is possible to estimate the most probable position of a vehicle by coupling two sets of positional information using the Kalman filter.

An observation equation used for the Kalman filter is described below.

Figure 6:
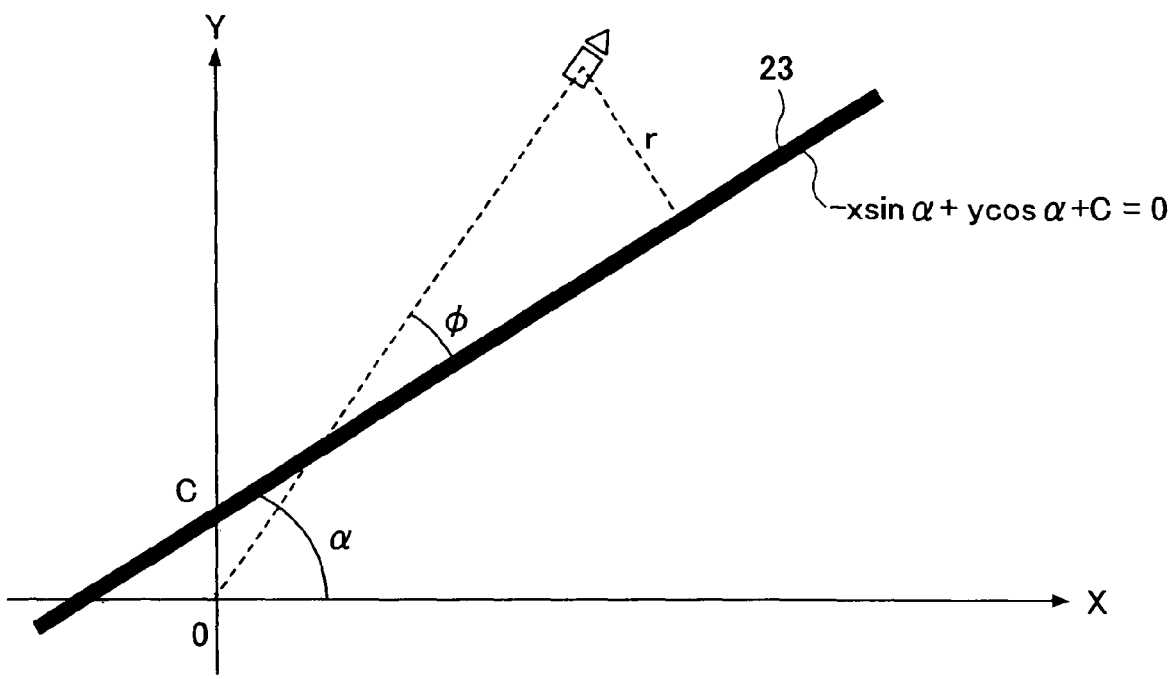
FIG. 6 is a graph used to describe an observation equation for the Kalman filter.

FIG. 6 is a graph used to describe an observation equation for the Kalman filter. The graph shows an exemplary coordinate system where the Y direction indicates north. When $X_t$ is the actual position and direction of a vehicle, $X_t$ is expressed as a function of a position (x, y) on a two-dimensional plane and an inclination of traveling direction θ.

$$X_t = (x, y, \theta) \quad (1)$$

In FIG. 6, a bold solid line indicates the link 23 and α indicates the inclination of the link 23 relative to the X axis. Also in FIG. 6, (0, c) indicates a point where a node of the link 23 intersects the y axis. On the above assumption, the link 23 is expressed by the following formula:

$$-x \cdot \sin\alpha + y \cdot \cos\alpha + c = 0 \quad (2)$$

Further in FIG. 6, φ indicates an inclination of $X_t$ relative to the link 23 and "r" indicates the distance between $X_t$ and the link 23. The inclination φ corresponds to a value obtained by the direction detecting unit 84 based on detection results of the yaw rate sensor 3, and the distance r corresponds to the offset amount r obtained just before the GPS signals are lost. In FIG. 6, the inclination α increases in the counterclockwise direction and the inclination φ increases in the clockwise direction.

The observation equation may be set up so that the distance r from the link 23 becomes 0 and the inclination of traveling direction θ relative to the link 23 becomes 0.

When observed quantities S=(α, c, r, φ), the observation equation may be expressed as a matrix having two rows and one column:

$$h(X, S) = \begin{pmatrix} -x\sin\alpha + y\cos\alpha + c - r \\ \text{or } (x\sin\alpha - y\cos\alpha - c - r) \\ \alpha - \theta - \phi \end{pmatrix} = \begin{pmatrix} 0 \\ 0 \end{pmatrix} \quad (3)$$

The upper element in the matrix is an expression of a distance from a link and the lower element is an expression of an inclination from the link. When the vehicle is at a position below the linear link, the upper element becomes "x·sin α−y cos α−c−r".

How to apply the observation equation (3) to the Kalman filter is described later in detail.

Figure 7:
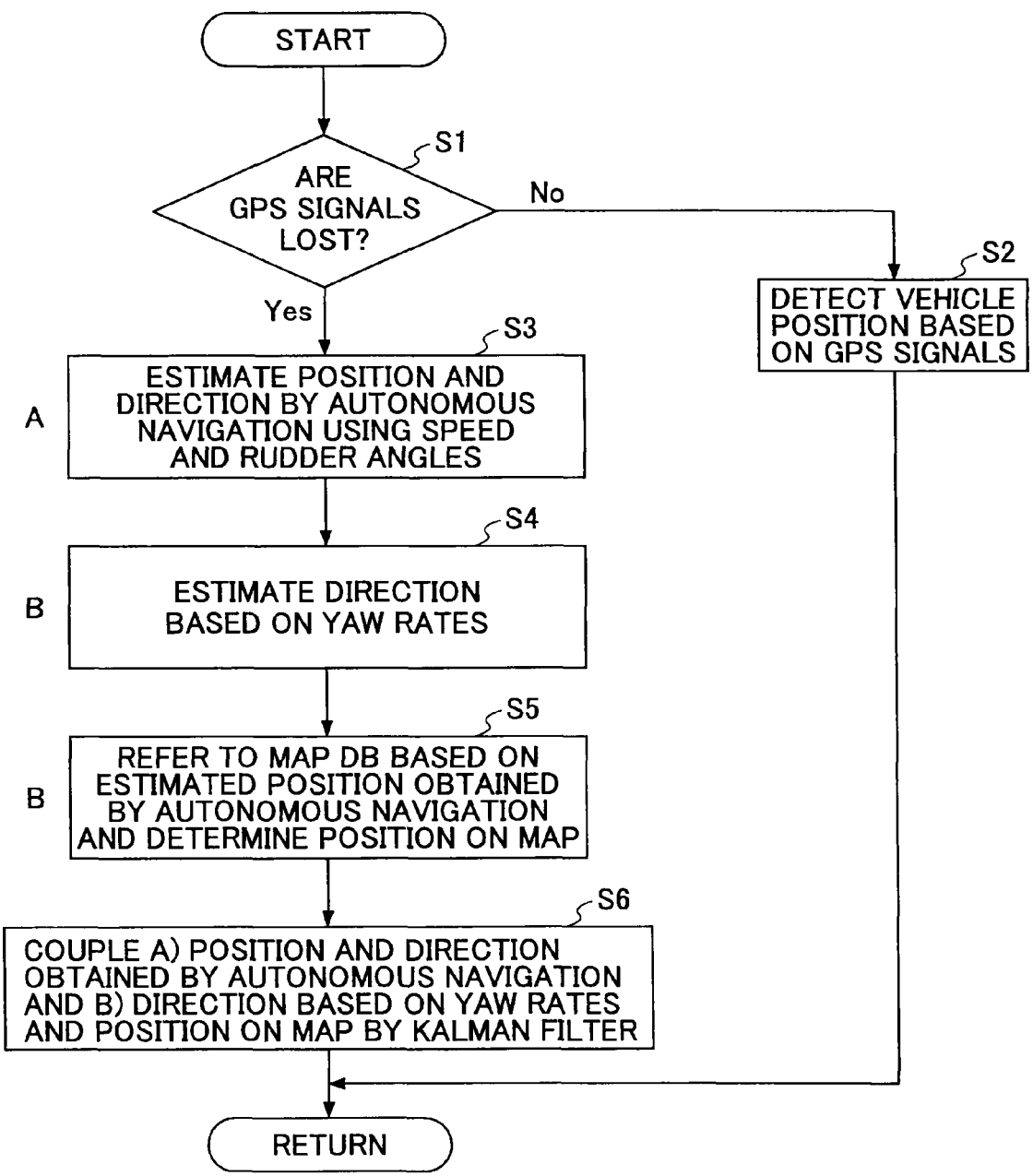
FIG. 7 is a flowchart showing a process of detecting the position of a vehicle with a positioning device according to the reception status of GPS signals.

FIG. 7 is a flowchart showing a process of detecting the position of a vehicle by the positioning device 9 according to the reception status of GPS signals.

The positioning device 9 determines whether GPS signals are lost, for example, each time when the GPS positioning unit 81 tries to detect the position of a vehicle (S1). If GPS signals are not lost (NO in S1), the positioning device 9 detects the position of the vehicle based on the GPS signals.

If GPS signals are lost (YES in S1), the INS positioning unit 82 estimates the position and direction of the vehicle by autonomous navigation, i.e. by updating the initial position 24 and the initial direction based on the traveling distance and direction obtained from the speed and rudder angle of the vehicle (S3). The INS positioning unit 82 also calculates the error variances of the estimated position 26 and the estimated direction according to errors in the detection results of the speed sensor 2 and the rudder sensor 4.

Meanwhile, the direction detecting unit 84 calculates the cumulative estimated direction 28 of the vehicle by updating the initial direction, which is obtained before the GPS signals are lost, based on integrals of yaw rates (S4). The direction detecting unit 84 also calculates the error variance of the cumulative estimated direction 28 according to errors in the detection results of the yaw rate sensor 3.

The map data positioning unit 83 refers to the map DB 5 based on the estimated position 26 obtained by the INS positioning unit 82 and determines the map data linked position 27 on a line that is distant from the link 23 by the offset amount r (S5).

Then, the Kalman filter calculation unit 85 couples, by using the Kalman filter, the estimated position and direction obtained based on the detection results of the sensor system A, and the map data linked position and the cumulative estimated direction obtained based on the detection results of the sensor system B (S5).

Thus, the positioning device 9 can obtain a final estimated position, i.e. the most probable position, of a vehicle based on two separate sets of positional information obtained from the detection results of two sensor systems. In the process described above, the order of steps S4 and S5 may be changed.

Estimation of a vehicle position by autonomous navigation has an advantage that it is based on the gradual changes of the state of the vehicle and has a disadvantage that its accuracy decreases as time passes. On the other hand, estimation of a vehicle position based on a map DB has an advantage that it can narrow down the likely vehicle position using map data and has a disadvantage that its result includes an error resulting from insufficient accuracy of map data.

The positioning device 9 of this embodiment estimates the most probable position of a vehicle with the Kalman filter taking into account errors in the positions estimated based on the detection results of two sensor systems. In other words, the positioning device 9 utilizes the advantages of the two sensor systems while compensating for their disadvantages. With such a configuration, the positioning device 9 can accurately correct a position estimated by autonomous navigation using map data.

Since the positioning device 9 can accurately estimate the position of a vehicle even when GPS signals are lost, it can provide drive assist information (such as vehicle control information and cautions) to the driver at appropriate timings.

<Application of Observation Equation to Kalman Filter>

How to apply the observation equation (3) to the Kalman filter is described below.

First, the observation equation (3) is linearized. For this purpose, the observation equation (3) is Taylor-expanded around an estimated position $\tilde{X}_t$ at time t.

$$h(\tilde{X}_t, \tilde{S}_t) + J'_x(X_t - \tilde{X}_t) + J'_s \Delta S = O_{2\times 1} \quad (4)$$

where
$X_t$ indicates true position
$\hat{S}_t$ indicates observed measurement
$\Delta S$ indicates measurement error
True measurement $S = \hat{S} + \Delta S$ In the equation (4), $J'_x$ and $J'_s$ are partial differentials of the observation equation.

$$J'_x = \frac{\partial h(X, S)}{\partial X} \bigg| X = \tilde{X}_t, S = \hat{S}_t$$

$$J'_s = \frac{\partial h(X, S)}{\partial S} \bigg| X = \tilde{X}_t, S = \hat{S}_t$$

The following equations are obtained by transforming the equation (4):

$$J'_x(X_t - \tilde{X}_t) = -h(\tilde{X}_t, \hat{S}_t) - J'_s \Delta S \quad (5)$$

Normalization $$AJ'_x(X_t - \tilde{X}_t) = -Ah(\tilde{X}_t, \hat{S}_t) - AJ'_s \Delta S \quad (6)$$

$$J_x(X_t - \tilde{X}_t) = -W_s - J_s \Delta S \quad (7)$$

Here, $J_x$, $-W_s$, and $J_s$ can be expressed as follows:

$$J_x = \begin{pmatrix} -\sin\alpha^* & \cos\alpha^* & 0 \\ 0 & 0 & -1 \\ 0 & 0 & 1 \end{pmatrix}$$

$$-W_s = -h(X_t^\sim, S_t^\wedge) = \begin{pmatrix} x^\sim \sin\alpha^* - y^\sim \cos\alpha^* - c^* + r^* \\ -\alpha^* + \theta^\sim + \phi^* \\ 0 \end{pmatrix}$$

$$J_s = \begin{pmatrix} -x^\sim \cos\alpha^* - y^\sim \sin\alpha^* & 1 & -1 & 0 \\ 1 & & 0 & 0 & 1 \end{pmatrix}$$

Also, since both state and observation equations are expressed as linear models in the Kalman filter, $X_s$ is defined as follows:

$$X_S = J_x(X_t - \tilde{X}_t)$$

When considered in an m-dimensional space multiplied by $J_x$, the following equation (8), which is a linear model, is obtained from the equation (7):

$$-W_s = X_s + J_s \Delta S \tag{8}$$

Since the measurement error $\Delta S$ is assumed to be a white Gaussian variance, its average $E(\Delta S) = 0$. Therefore, $$E(J_s \Delta S) = 0$$

$$E(J_s \Delta S \Delta S^T J_s^T) = J_s E(\Delta S \Delta S^T) J_s^T = J_s Q_s J_s^T \equiv Q'_s \tag{9}$$

When considered in the m-dimensional space multiplied by $J_x$, the average and variance of estimated positions obtained by autonomous navigation can be expressed as follows:

$$E(X_s) = J_x E(X_t - \tilde{X}_t) = E(\Delta X_t) = 0 \tag{10}$$

where the average $E(\Delta X_t) = 0$ $$E(X_s X_s^T) = J_x E[(X_t - \tilde{X}_t)(X_t - \tilde{X}_t)^T] J_x^T = J_x \Sigma_{xt} J_x^T \equiv \Sigma_{xs} \tag{11}$$

From the above equations, the most probable position can be obtained as follows:

$$X_{Sfu} = \overline{X}_s + \sum_{sfu} I^T (Q'^{-1}_s)(-W_s - I * \overline{X}_s) \tag{12}$$

$$= \sum_{sfu} (Q^{-1}_s)(-W_s)$$

where $$\sum_{sfu} = \left( \sum_{xs}^{-1} + I^T (Q'^{-1}_s) I \right)^{-1}$$

$$= \left( \sum_{xs}^{-1} + (Q'^{-1}_s) \right)^{-1}$$

The equation (12) is then converted back into the $X = (x, y, \theta)$ space by inverse mapping.

$$\Sigma_{x*} = J_x^{-1} \Sigma_{Sfu} (J_x^T)^{-1} \tag{13}$$

$$\overline{X}_* = \tilde{X}_t + J_x^{-1} X_{sfu}$$

<Detection Results of Positioning Device 9>

Figure 8A:
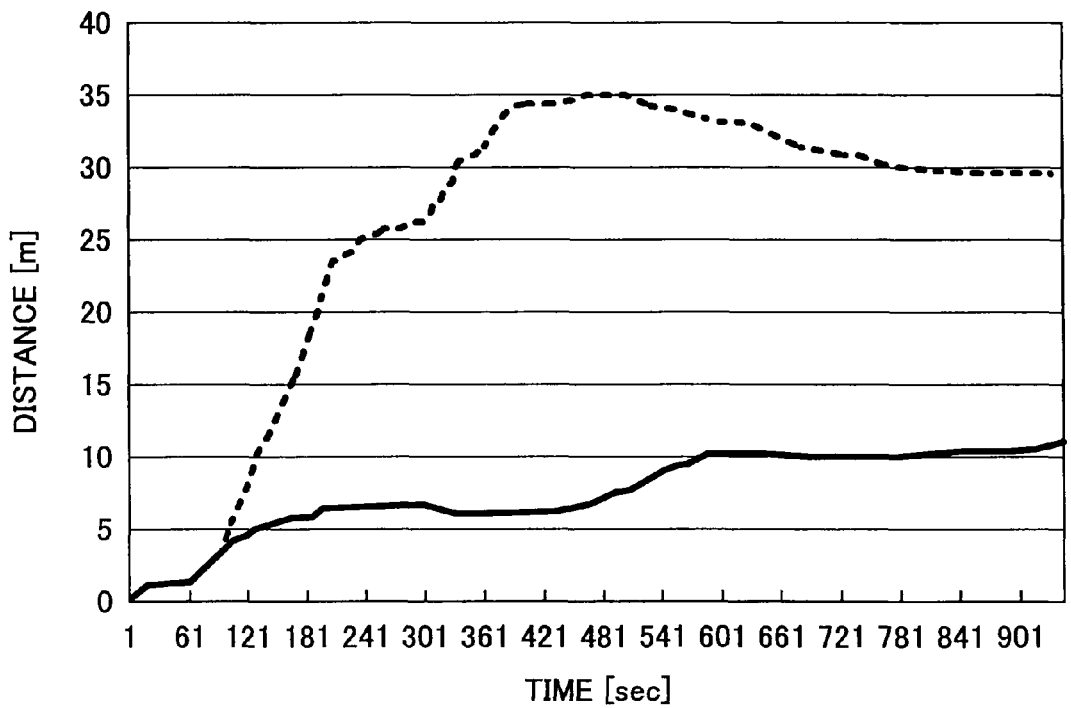
FIGS. 8A and 8B are graphs showing results of an experiment using a positioning device.
Figure 8B:
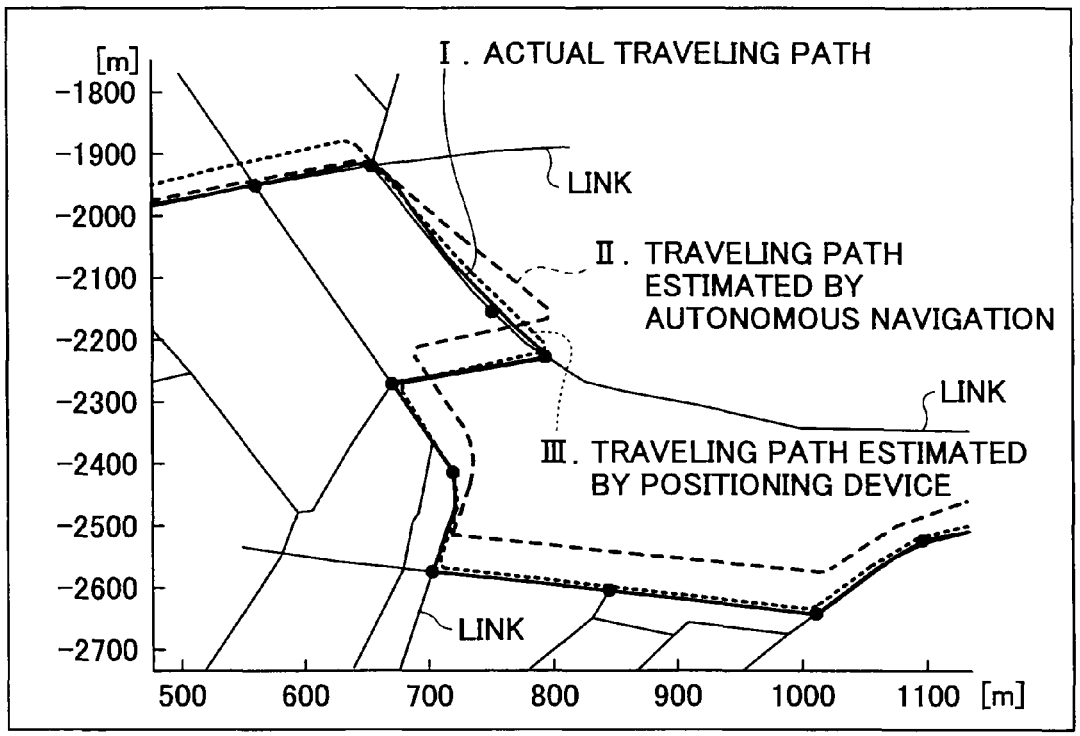

FIGS. 8A and 8B are graphs showing results of estimating the position of a vehicle on a general-purpose road by the positioning device 9 while GPS signals are lost. The duration of this experiment was about 950 s. that roughly corresponds to the duration for which the GPS signals were lost.

In the experiment, the offset amount r was set to 10 m that corresponds to the standard deviation. Also, the error covariance matrix $Q_s$ of observed quantities $S = (\alpha, c, r, \phi)$ was set as follows:

$$Q_s = \begin{pmatrix} 0 & 0 & 0 & 0 \\ 0 & 0 & 0 & 0 \\ 0 & 0 & 100 & 0 \\ 0 & 0 & 0 & 0.001 \end{pmatrix}$$

The order of elements in the error covariance matrix $Q_s$ is $\alpha$, c, r, and $\phi$.

FIG. 8A shows deviations of the position estimated by autonomous navigation and the position estimated by the positioning device 9 of this embodiment from the actual traveling path (true value) determined by another system. In FIG. 8A, the horizontal axis indicates measurement time (traveling time) and the vertical axis indicates average cumulative errors in distance [m].

As shown in FIG. 8A, the position estimated by autonomous navigation deviated from the true value more than 30 m at some points while the position estimated by the positioning device 9 of this embodiment deviated only about 10 m even after 950 s.

FIG. 8B shows I. actual traveling path determined by another system, II. traveling path estimated by autonomous navigation, and III. traveling path estimated by the positioning device 9 of this embodiment. In FIG. 8B, black dots indicate nodes. As shown in FIG. 8B, the actual traveling path determined by the other system substantially matches a traveling path (or links indicated by thin solid lines) extracted from the map DB 5.

The traveling path estimated by autonomous navigation runs along the links but deviates greatly from the actual traveling path at some points. Therefore, even if the positions estimated by autonomous navigation are mapped to map data, the results naturally include errors. On the other hand, the traveling path estimated by the positioning device 9 of this embodiment accurately matches the actual traveling path. As is evident from FIG. 8B, the position correction method of this embodiment has an advantage especially in correcting positional deviation in a direction orthogonal to the traveling direction of a vehicle.

The present invention is not limited to the specifically disclosed embodiments, and variations and modifications may be made without departing from the scope of the present invention.

The present international application claims priority from Japanese Patent Application No. 2006-202475 filed on Jul. 25, 2006, the entire contents of which are hereby incorporated herein by reference.

INDUSTRIAL APPLICABILITY

The present invention generally relates to a positioning device for detecting the position of a mobile body and a navigation system including the positioning device. More particularly, the present invention relates to a positioning device that estimates the current position of a mobile body by updating a previous position of the mobile body detected by radio navigation based on information from an autonomous sensor and map data, and a navigation system including the positioning device.

The invention claimed is:

1. A positioning device that detects a position of a mobile body with a radio navigation positioning unit, comprising:
   first and second autonomous sensors configured to obtain, respectively, first and second behavioral information on the mobile body;
   a position detecting unit configured to obtain an estimated position of the mobile body by updating a detection result from the radio navigation positioning unit based on the first behavioral information obtained by the first autonomous sensor;
   a map data positioning unit configured to refer to a map data storage unit based on the estimated position obtained by the position detecting unit and thereby to obtain a map data linked position that is a predetermined distance away from a link corresponding to the estimated position;

a most probable position estimating unit configured to estimate the position of the mobile body from the estimated position and the map data linked position by applying an observation equation to a Kalman filter which couples the first behavioral information obtained by the first autonomous sensor with the second behavioral information obtained by the second autonomous sensor; and a direction detecting unit configured to obtain a cumulative estimated direction by updating the detection result from the radio navigation positioning unit based on the second behavioral information obtained by the second autonomous sensor, wherein the position detecting unit is further configured to estimate a direction of the mobile body based on the first behavioral information, and the most probable position estimating unit is configured to estimate the position of the mobile body from the estimated position, the map data linked position, the estimated direction, and the cumulative estimated direction by applying the observation equation to the Kalman filter.

2. The positioning device as claimed in claim 1, wherein the first autonomous sensor includes a rudder angle sensor and a speed sensor;
the second autonomous sensor includes a yaw rate sensor; and
the observation equation of the Kalman filter is expressed as follows:

$$h(X, S) = \begin{pmatrix} -x\sin\alpha + y\cos\alpha + c - r \\ \text{or } (x\sin\alpha - y\cos\alpha - c - r) \\ \alpha - \theta - \phi \end{pmatrix} = \begin{pmatrix} 0 \\ 0 \end{pmatrix},$$

wherein
$X=(x,y,\theta)$,
$S=(\alpha,c,r,\theta)$,
(x,y): position of the mobile body in a predetermined two-dimensional plane formed by an x-axis and a y-axis,
$\theta$: inclination of a traveling direction of the mobile body in the two-dimensional plane,
$\alpha$: inclination of the corresponding link in the two-dimensional plane relative to the x-axis,
c: intercept of the corresponding link with the y-axis,
r: the predetermined distance, and
$\phi$: inclination of the position of the mobile body relative to the corresponding link in the two-dimensional plane, the inclination being obtained based on detection results of the yaw rate sensor.

3. A navigation system, comprising:
the positioning device as claimed in claim 1.

4. The positioning device as claimed in claim 1, wherein the predetermined distance corresponds to a distance between an initial position of the mobile body, which is obtained just before signals from the radio navigation positioning unit are lost, and a corresponding initial link.

5. A positioning device that detects a position of a mobile body with a radio navigation positioning unit, comprising:
first and second autonomous sensors configured to obtain, respectively, first and second behavioral information on the mobile body;

means for obtaining an estimated position of the mobile body by updating a detection result from the radio navigation positioning unit based on the first behavioral information obtained by the first autonomous sensor;

means for obtaining a map data linked position that is a predetermined distance away from a link corresponding to the estimated position by referring to a map data storage unit based on the estimated position obtained by the means for obtaining the estimated position of the mobile body;

means for estimating a most probable position of the mobile body from the estimated position and the map data linked position by applying an observation equation to a Kalman filter which couples the first behavioral information obtained by the first autonomous sensor with the second behavioral information obtained by the second autonomous sensor; and means for obtaining a cumulative estimated direction by updating the detection result from the radio navigation positioning unit based on the second behavioral information obtained by the second autonomous sensor, wherein the means for obtaining the estimated position of the mobile body also estimates a direction of the mobile body based on the first behavioral information, and the means for estimating the most probable position estimates the position of the mobile body from the estimated position, the map data linked position, the estimated direction, and the cumulative estimated direction by applying the observation equation to the Kalman filter.

6. The positioning device as claimed in claimed in claim 5, wherein:
the first autonomous sensor includes a rudder angle sensor and a speed sensor to obtain the first behavioral information; and
the second autonomous sensor includes a yaw rate sensor to obtain the second behavioral information.

7. A positioning method for detecting a position of a mobile body with a radio navigation positioning unit, comprising:
obtaining, from first and second autonomous sensors, first and second behavioral information on the mobile body;
obtaining an estimated position of the mobile body by updating a detection result from the radio navigation positioning unit based on the first behavioral information obtained by the first autonomous sensor;
obtaining a map data linked position that is a predetermined distance away from a link corresponding to the estimated position by referring to a map data storage unit based on the estimated position obtained by the obtaining the estimated position of the mobile body;
estimating a most probable position of the mobile body from the estimated position and the map data linked position by applying an observation equation to a Kalman filter which couples the first behavioral information obtained by the first autonomous sensor with the second behavioral information obtained by the second autonomous sensor; and
obtaining a cumulative estimated direction by updating the detection result from the radio navigation positioning unit based on the second behavioral information obtained by the second autonomous sensor; and
obtaining an estimated a direction of the mobile body based on the first behavioral information, wherein
the most probable position is estimated from the estimated position, the map data linked position, the estimated direction, and the cumulative estimated direction by applying the observation equation to the Kalman filter.

8. The method claimed in claimed in claim 7, wherein:
the first autonomous sensor includes a rudder angle sensor and a speed sensor to obtain the first behavioral information; and
the second autonomous sensor includes a yaw rate sensor to obtain the second behavioral information.

* * * * *